(No Model.)
J. RASCHEN.
PROCESS OF MAKING CYANIDS.
No. 567,551. Patented Sept. 8, 1896.
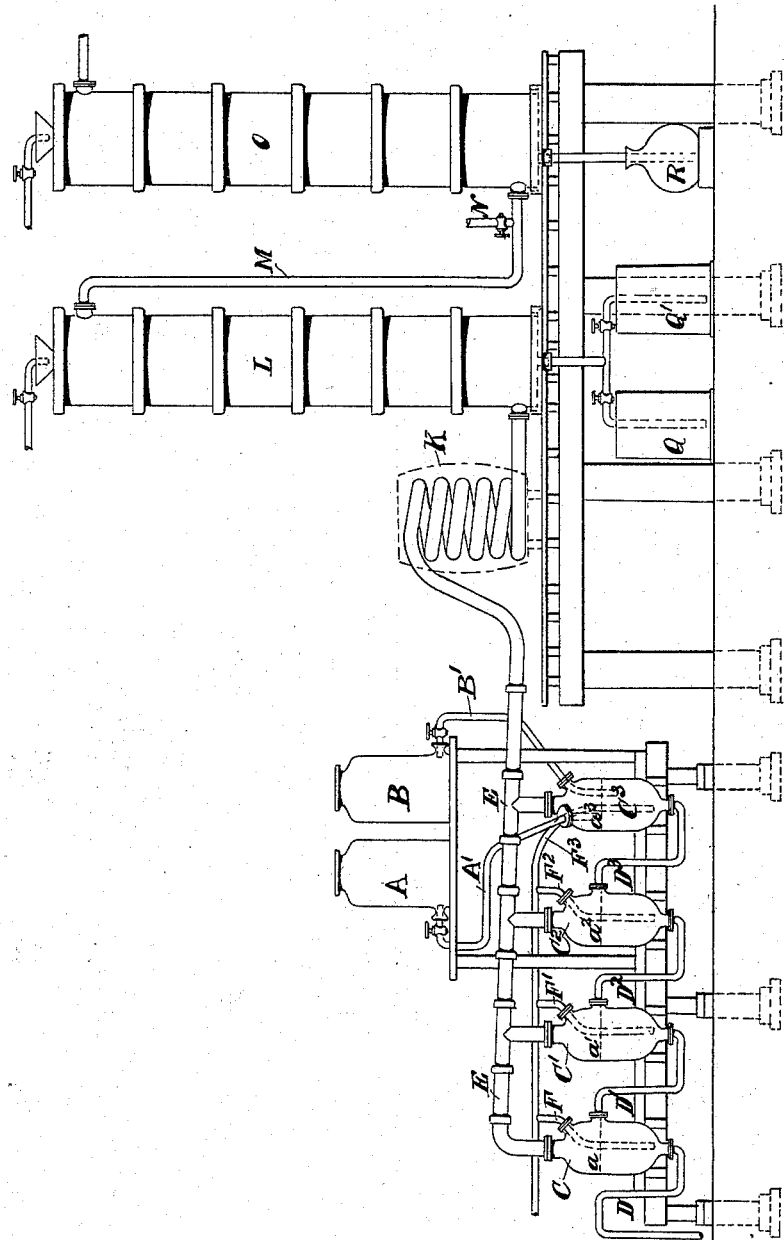

UNITED STATES PATENT OFFICE.

JULIUS RASCHEN, OF LIVERPOOL, ENGLAND, ASSIGNOR TO THE UNITED ALKALI COMPANY, LIMITED, OF SAME PLACE.

PROCESS OF MAKING CYANIDS.

SPECIFICATION forming part of Letters Patent No. 567,551, dated September 8, 1896.

Application filed December 23, 1895. Serial No. 573,153. (No specimens.)

*To all whom it may concern:*

Be it known that I, JULIUS RASCHEN, Ph.D., analytical chemist, a subject of the Queen of Great Britain and Ireland, residing at G 11 Exchange Buildings, Liverpool, in the county of Lancaster, England, have invented certain Improvements in the Manufacture of Cyanids and Ferrocyanids from Sulfocyanids and in the Recovery of By-Products, of which the following is a specification.

The manufacture of cyanids and ferrocyanids from sulfocyanids has hitherto been attended with great difficulties. The separation of the sulfur contained in the sulfocyanids has generally been attempted by treating the fused sulfocyanid with a metal such as iron, zinc, or lead. All these processes demand a high temperature, at which a considerable loss of cyanid is incurred, owing to various well-known causes.

According to the present invention, a sulfocyanid, such as calcium sulfocyanid, is treated with an oxidizing agent, such as nitric acid, or with a mixture of an oxidizing agent, such as a nitrate, chromate, lead peroxid, manganese peroxid, or the like, with water and an acid, such as sulfuric acid. I thus oxidize the sulfur contained in the sulfocyanid into sulfuric acid and at the same time liberate the cyanogen in the form of hydrocyanic acid. It is advisable that all the raw materials used should be as free from chlorids as possible.

I may proceed according to this invention as follows: I mix a sulfocyanid, such as sodium or calcium sulfocyanid, with about four to five times its weight of water and allow this mixture to flow gradually into a closed vessel containing some water, (or mother liquor from a previous operation,) which we maintain at or near its boiling-point, say about 96° centigrade. Simultaneously I admit nitric acid into the vessel through a separate pipe at such a rate that there shall always be free nitric acid in the vessel. Excess of sulfocyanid should be avoided. Or I mix an oxidizing agent, such as manganeze peroxid, for example, with water and sulfuric acid, and add thereto the sulfocyanid, such as calcium sulfocyanid. The vessel is closed air-tight, and is provided with an exit pipe or passage conducting the gases evolved during the reaction to a suitable absorbing apparatus, and the said vessel may be provided with a stirrer or agitator. I gradually heat the mixture nearly to the boiling-point of water, when decomposition takes place, the sulfur of the sulfocyanid being converted into sulfuric acid, which remains in the vessel, together with the sulfates of the base of the sulfocyanid and that of the oxidizing agent, while hydrocyanic acid is liberated and passes through the exit pipe, or passage, together with any other gases that may be liberated. As the reaction is rather violent, I prefer to heat by itself the mixture of the oxidizing agent, water, and sulfuric acid, and then to add gradually to this heated mixture the sulfocyanid, either in solution or in suspension, in water, taking care to have more of the oxidizing agent and acid present than is indicated by the following equation:

$$NaCNS + 3H_2SO_4 + 3MnO_2 = HCN + NaHSO_4 + 3MnSO_4 + 2H_2O,$$

(choosing sodium sulfocyanid and manganese peroxid as examples.) Toward the ends of this operation the mixture is heated to boiling, in order to expel the hydrocyanic acid. The residual liquor is then withdrawn, and may be treated in a suitable manner for the recovery of any base or acid, or both, which it may contain.

The gaseous mixture of hydrocyanic acid, steam, and other gas is passed through or over a solution of a caustic alkali or alkaline earth contained in a suitable vessel or series of vessels, which may be provided with agitators. The hydrocyanic acid combines with the caustic alkali or alkaline earth and forms the corresponding cyanid. The solution of cyanid so obtained may be evaporated to dryness, which may best be done in a vacuum-pan, whereby the cyanid is obtained in the solid state, or the solution of the cyanid may be treated with a salt of iron or an oxid of iron and converted into the corresponding ferrocyanid, which may be dealt with in the usual way, so as to obtain the ferrocyanid in the crystalline form.

If nitric acid or a nitrate be the oxidizing agent employed in the above process, the hydrocyanic acid will be mixed with nitric-oxid gas, which will pass unabsorbed through the caustic alkali or alkaline earth if care has been taken to exclude air from the apparatus. This nitric oxid can be recovered in the form of nitric acid by passing the gas issuing from the vessels in which the absorption of the hydrocyanic acid has been completed into another apparatus, where it is mixed with air and steam, as is well understood.

The accompanying drawing represents diagrammatically an arrangement of apparatus in which the described process may be carried out.

A and B are stoneware vessels, the one containing nitric acid, the other the sulfocyanid, which flow through pipes A' and B' into the stoneware decomposer $C^3$, filled with water to the dotted line $a^3$. From $C^3$ the solution flows through vessel $D^3$ into vessel $C^2$, through $D^2$ into $C'$, and by pipe D' into C, and therefrom by pipe D. The level of water in these is indicated by the dotted lines $a$ $a'$ $a^2$.

F F' $F^2$ $F^3$ are steam-pipes with branches leading down into the vessels C to $C^3$.

The evolved gases pass through the pipe E into the cooler K and thence into the absorber L, in which the hydrocyanic acid is condensed by cold water supplied by the tap above and flows into receptacles Q and Q', containing the caustic alkali. The remaining gases pass through the pipe M, and with air and steam admitted through pipe N pass into the nitric-acid condenser O, fed with water by the tap above, when the recovered nitric acid flows into the receiver R. The whole apparatus is kept under a slight vacuum by a vacuum-pump connected to a pipe P.

The several vessels C are used partly to avoid the stirrer and partly to enable the process to be continuous.

In carrying out this invention great care must be taken not to allow any of the gases to escape into the air before they have been freed from the hydrocyanic acid they contain. Owing to the poisonous properties of this substance, it is necessary to have all the vessels perfectly tight, and it is advisable to maintain a slight vacuum in all the vessels, so as to prevent the possibility of any escape of hydrocyanic acid.

I have found that when nitric acid or a nitrate is used as the oxidizing agent small amounts of the higher oxids of nitrogen are present in the gases which pass into the absorber, and these higher oxids of nitrogen are absorbed, together with the hydrocyanic acid, by the caustic alkali or alkaline earth. In this case the solution of the cyanid may, if desired, be evaporated to dryness, but should not be fused, since on fusion a mixture of nitrates, nitrites, and cyanids reacts violently. If fusion is to be resorted to, removal of the higher oxids of nitrogen should be effected by means of hot water before the gases pass into the absorber, as described in the specification of my application for Letters Patent, Serial No. 573,154, dated December 23, 1895.

Having now particularly described and ascertained the nature of the said invention and in what manner the same is to be performed, I declare that what I claim is—

1. In the manufacture of cyanids, from sulfocyanids, the process herein described consisting in mixing the sulfocyanid with water and heating it in presence of an excess of oxidizing agent, such as specified, to nearly the boiling-point of water, and passing the evolved gaseous mixture in contact with a solution of caustic alkali, or alkaline earth, so that the hydrocyanic acid is absorbed thereby, substantially as hereinbefore described.

2. In the manufacture of cyanids from sulfocyanids, the process herein described consisting in heating the sulfocyanid mixed with water in presence of nitric acid, passing the evolved gases through a solution of caustic alkali or alkaline earth, whereby the hydrocyanic acid is absorbed, and treating the nitric-oxid gas, which passes unabsorbed through the caustic alkali, with air and steam thereby reconverting it into nitric acid, as set forth.

3. In the manufacture of cyanids, from sulfocyanids, the process herein described consisting in mixing the sulfocyanid with water and heating it in presence of an oxidizing agent, such as specified, to nearly the boiling-point of water, and passing the evolved gaseous mixture in contact with a solution of caustic alkali, or alkaline earth, so that hydrocyanic acid is absorbed thereby, the entire operation being conducted out of contact with the atmosphere, substantially as described.

In testimony whereof I have signed my name to this specification in the presence of two subscribing witnesses.

J. RASCHEN.

Witnesses:
WM. PIERCE,
WM. G. MURRAY.